United States Patent
Criminisi et al.

(10) Patent No.: US 8,351,654 B2
(45) Date of Patent: Jan. 8, 2013

(54) IMAGE PROCESSING USING GEODESIC FORESTS

(75) Inventors: Antonio Criminisi, Cambridge (GB); Toby Sharp, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 12/431,421

(22) Filed: Apr. 28, 2009

(65) Prior Publication Data

US 2010/0272367 A1    Oct. 28, 2010

(51) Int. Cl.
*G06K 9/00* (2006.01)
*E04B 7/08* (2006.01)

(52) U.S. Cl. .......................... 382/109; 52/81.1

(58) Field of Classification Search ............ 382/103, 382/128–137, 167, 173, 195, 109; 348/169–172; 52/81.1
See application file for complete search history.

(56) References Cited

U.S. PATENT DOCUMENTS

| | | | |
|---|---|---|---|
| 6,298,145 B1 * | 10/2001 | Zhang et al. .................. | 382/103 |
| 6,694,057 B1 | 2/2004 | Miller et al. | |
| 6,902,935 B2 * | 6/2005 | Kaufman et al. .............. | 436/63 |
| 7,239,719 B2 | 7/2007 | Bongiovanni et al. | |
| 7,265,752 B2 | 9/2007 | Sander et al. | |
| 7,274,810 B2 * | 9/2007 | Reeves et al. ................. | 382/128 |
| 7,471,848 B2 | 12/2008 | Fujimoto et al. | |
| 7,773,791 B2 * | 8/2010 | Simon et al. .................. | 382/128 |
| 2002/0094112 A1 | 7/2002 | Makram-Ebeid | |
| 2002/0150305 A1 | 10/2002 | Gil et al. | |
| 2003/0011596 A1 | 1/2003 | Zhang et al. | |
| 2003/0123072 A1 * | 7/2003 | Spronk ......................... | 358/1.9 |
| 2003/0144585 A1 | 7/2003 | Kaufman et al. | |
| 2003/0161516 A1 | 8/2003 | Vuylsteke | |
| 2003/0161518 A1 | 8/2003 | Vuylsteke | |
| 2003/0161519 A1 | 8/2003 | Vuylsteke | |
| 2005/0128211 A1 | 6/2005 | Berger et al. | |
| 2005/0163358 A1 | 7/2005 | Moeller | |
| 2006/0245645 A1 | 11/2006 | Yatziv et al. | |
| 2006/0251298 A1 | 11/2006 | Bronstein et al. | |

(Continued)

FOREIGN PATENT DOCUMENTS

WO    WO2008012808 A2    1/2008

OTHER PUBLICATIONS

Agarwala, et al, "Interactive Digital Photomontage", ACM SIGGRAPH, 2004, pp. 1-9.

(Continued)

*Primary Examiner* — Abolfazl Tabatabai
(74) *Attorney, Agent, or Firm* — Zete Law, P.L.L.C.; MacLane C. Key

(57) ABSTRACT

Image processing using geodesic forests is described. In an example, a geodesic forest engine determines geodesic shortest-path distances between each image element and a seed region specified in the image in order to form a geodesic forest data structure. The geodesic distances take into account gradients in the image of a given image modality such as intensity, color, or other modality. In some embodiments, a 1D processing engine carries out 1D processing along the branches of trees in the geodesic forest data structure to form a processed image. For example, effects such as ink painting, edge-aware texture flattening, contrast-aware image editing, forming animations using geodesic forests and other effects are achieved using the geodesic forest data structure. In some embodiments the geodesic forest engine uses a four-part raster scan process to achieve real-time processing speeds and parallelization is possible in many of the embodiments.

19 Claims, 14 Drawing Sheets

U.S. PATENT DOCUMENTS

| | | | |
|---|---|---|---|
| 2006/0251324 | A1 | 11/2006 | Bachmann et al. |
| 2007/0014462 | A1 | 1/2007 | Rousson et al. |
| 2007/0025616 | A1 | 2/2007 | Grady et al. |
| 2007/0031037 | A1 | 2/2007 | Blake et al. |
| 2007/0237421 | A1 | 10/2007 | Luo et al. |
| 2008/0002873 | A1 | 1/2008 | Reeves et al. |
| 2008/0033897 | A1 | 2/2008 | Lloyd |
| 2008/0044104 | A1 | 2/2008 | Gering |
| 2008/0069445 | A1 | 3/2008 | Weber |
| 2008/0075361 | A1 | 3/2008 | Winn et al. |
| 2008/0181503 | A1 | 7/2008 | Schclar et al. |

OTHER PUBLICATIONS

Avidan, et al., "Seam Carving for Content-Aware Image Resizing", retrieved on Feb. 17, 2009 at <<http://www.shaiavidan.org/papers/imretFinal.pdf>>, 9 pages.

Bai, et al, "A Geodesic Framework for Fast Interactive Image and Video Segmentation and Matting", retrieved at <<http://www.ieeexplore.ieee.org/iel5/4408818/4408819/04408931.pdf?tp=&isnumber=4408819&arnumber=4408931>>, IEEE, 2007, pp. 1-8.

Bendels, et al., "Image and 3D-Object Editing with Precisely Specified Editing Regions", retrieved on Feb. 17, 2009 at <<http://citeseerx.ist.psu.edu/viewdoc/download;jsessionid=ADCBF6715209FA8B6286AF79A9B6C006?doi=10.1.1.2.9816&rep=rep1&type=pdf>>, VMV, 2003, 9 pages.

Blake, et al, "Interactive Image Segmentation using an Adaptive GMMRF Model", retrieved at <<http://research.microsoft.com/vision/cambridge/papers/Blake_ECCV04.pdf>>, pp. 1-14, May 2004.

Borgefors, "Distance Transformations in Digital Images", Computer Vision, Graphics and Image Processing, vol. 34, 1986, pp. 344-371.

Bousseau, et al, "Video Watercolorization using Bidirectional Texture Advection", ACM SIGGRAPH, 2007, pp. 1-7.

Boykov, et al, "An Experimental Comparison of Min-Cut/Max-Flow Algorithms for Energy Minimization in Vision", retrieved at <<http://www.csd.uwo.ca/~yuri/Papers/pami04.pdf>>, IEEE Transactions on PAMI, vol. 26, No. 9, Sep. 2004, pp. 1124-1137.

Boykov, et al, "Fast Approximate Energy Minimization via Graph Cuts", retrieved at <<http://www.soe.ucsc.edu/classes/cmpe290v/Spring05/graphcutpdf>>, Computer Science Department Cornell University, pp. 1-8, Sep. 1999.

Boykov, et al, "Interactive Graph Cuts for Optimal Boundary & Region Segmentation of Objects in N-D Images", retrieved at <<http://www.csd.uwo.ca/~yuri/Papers/iccv01.pdf>>, Proceedings of Internation Conference on Computer Vision, vol. I, Jul. 2001, pp. 105-112.

Breu, et al., "Linear Time Euclidean Distance Transform Algorithms", retrieved on Feb. 17, 2009 at <<http://ieeexplore.ieee.org/stamp/stamp.jsp?arnumber=391389&isnumber=8868, IEEE Transactions on Pattern Analysis and Machine Intelligence, vol. 17, No. 5, May 1995, pp. 529-533.

Bronstein, et al., "Parallel algorithms for approximation of distance maps on parametric surfaces" retrieved on Feb. 17, 2009 at <<http://www.cs.technion.ac.il/users/wwwb/cgi-bin/tr-get.cgi/2007/CIS/CIS-2007-03.pdf>>, Computer Science Department—Technical Report, Technion, 2007, pp. 1-22.

Brown, et al., "Multi-Image Matching using Multi-Scale Oriented Patches", retrieved on Feb. 17, 2009 at <<http://graphics.cs.cmu.edu/courses/15-463/2007_fall/Papers/MOPS.pdf>>, 8 pages.

Buades, et al., "A non-local algorithm for image denoising", retrieved Feb. 17, 2009 at <<http://ieeexplore.ieee.org/stamp/stamp.jsp?arnumber=01467423>>, 6 pages.

CERTIS, retrieved on Feb. 17, 2009 at <<http://www.enpc.fr/fr/recherche/documents/08CERTISFRAG.pdf>>, 2007, Title Page and pp. 1-13.

Chen, et al, "Real-time Edge-Aware Image Processing with the Bilateral Grid", ACM SIGGRAPH, 2007, pp. 1-9.

Cohen-Or, et al., "Three Dimensional Distance Field Metamorphosis", retrieved on Feb. 17, 2009 at <<http://delivery.acm.org/10.1145/280000/274366/p116-cohen-or.pdf?key1=274366&key2=8336394321&coll=GUIDE&dl=GUIDE&CFID=23042302&CFTOKEN=31161478>>, ACM Transactions on Graphics, vol. 17, No. 2, Apr. 1998, pp. 116-141.

Comaniciu, et al., "Mean Shift: A Robust Approach Toward Feature Space Analysis", retrieved on Feb. 17, 2009 at <<http://ieeexplore.ieee.org/stamp/stamp.jsp?arnumber<1000236&isnumber=21601>>, IEEE Transaction on Pattern Analysis and Machine Intelligence, vol. 24, No. 5, May 2002.

Criminisi, et al., "Bilayer Segmentation of Live Video", retrieved at <<http://www.adastral.ucl.ac.uk/~vladkolm/papers/CCBK-CVPR06.pdf>>, pp. 1-8, Dec. 2006.

Criminisi, et al., "GeoS: Geodesic Image Segmentation", retrieved on Feb. 17, 2009 at <<http://research.microsoft.com/pubs/71446/Criminisi_eccv2008.pdf>>, ECCV, Part 1, LNCS 5302, Springer-Verlag, 2008, pp. 99-112.

Danielsson, "Euclidean Distance Mapping", Computer Graphics and Image Processing, Academic Press, 1980, pp. 227-248.

Falcao, et al, "The Image Foresting Transform: Theory, Algorithms, and Applications", IEEE Transactions on Pattern Analysis and Machine Intelligence, vol. 26, No. 1, Jan. 2004, pp. 19-29.

Felsberg, et al, "Channel Smoothing: Efficient Robust Smoothing of Low-Level Signal Features", IEEE Transactions on Pattern Analysis and Machine Intelligence, vol. 28, No. 2, Feb. 2006, pp. 209-222.

Fischer, et al., "Fast Approximation of High Order Voronoi Diagrams and Distance Transforms on the GPU", retrieved on Feb. 17, 2009 at <<http://www.cs.technion.ac.il/~gotsman/AmendedPubl/Fischer/voronoi.pdf>>, pp. 1-16.

Grady, et al., "Fast Approximate Random Walker Segmentation Using Eigenvector Precomputation", retrieved on Feb. 17, 2009 at <<http://cns-web.bu.edu/~lgrady/grady2008fast.pdf>>, Proceedings of CVPR, 2008, pp. 1-9.

Juan, et al, "Active Graph Cuts", retrieved at <<http://ieeexplore.ieee.org/iel5/10924/34373/01640863.pdf?tp=&isnumber=34373&arnumber=1640863>>, IEEE, 2006, pp. 1-7.

Kohli, et al, "Dynamic Graph Cuts for Efficient Interference in Markov Random Fields", retrieved at <<http://ieeexplore.ieee.org/iel5/34/4375367/04359296.pdf?tp=&isnumber=4375367&arnumber=4359296>>, IEEE Transactions on Pattern Analysis and Machine Intelligence, vol. 29, No. 12, Dec. 2007, pp. 2079-2088.

Kolmogorov, et al, "Applications of Parametric Maxflow in Computer Vision", retrieved at <<http://research.microsoft.com/~carrot/publications_files/ParaMaxFlow_iccv07.pdf>>, pp. 1-8, Jan. 2007.

Kolmogorov, et al, "Bi-layer Segmentation of Binocular Stereo Video", IEEE CVPR, 2005, pp. 1-8.

Kolmogorov, "Convergent Tree-Reweighted Message Passing for Energy Minimization", retrieved on Feb. 17, 2009 at <<http://ieeexplore.ieee.org/ielx5/34/35279/01677515.pdf?tp=>>, IEEE Transactions on Pattern Analysis and Machine Intelligence, vol. 28, No. 10, Oct. 2006, pp. 1568-1583.

Kolmogorov, et al, "Multi-Camera Scene Reconstruction via Graph Curts", retrieved at <<http://www.cs.cornell.edu/rdz/Papers/KZ-ECCV02-recon.pdf>>, pp. 1-16, May 2002.

Kolmogorov, et al, "What Energy Functions Can Be Minimized via Graph Cuts?", retrieved at <<http://www.cs.cornell.edu/~rdz/Papers/KZ-PAMI04.pdf>>, IEEE Transactions on Pattern Analysis and Machine Intelligence, vol. 26, No. 2, Feb. 2004, pp. 147-159.

Komodakis, et al, "Fast, Approximately Optimal Solutions for Single and Dynamic MRF's", retrieved at <<http://www.csd.uoc.gr/~komod/publications/docs/CVPR07_FastPD.pdf>>, pp. 1-8, Oct. 2007.

Kopf, et al, "Joint Bilateral Upsampling", ACM Transactions on Graphics (Proceedings of Siggraph 2007), vol. 26, No. 3, 2007, pp. 1-5.

Lempitsky, et al, "LogCut—Efficient Graph Cut Optimization for Markov Random Fields", retrieved at <<http://research.microsoft.com/~victlem/logcut.pdf>>, pp. 1-8, Jan. 2007.

Levin, et al., "Colorization using Optimization", retrieved on Feb. 17, 2009 at <<http://people.csail.mit.edu/alevin/papers/colorization-siggraph04.pdf>>, 6 pages.

Li, et al., "Lazy Snapping", retrieved on Feb. 17, 2009 at <<http://www.cse.ust.hk/~cktang/sample_pub/lazy_snapping.pdf>>, ACM, 2004, pp. 303-308.

Lischinski, et al., "Interactive Local Adjustment of Tonal Values", retrieved on Feb. 17, 2009 at <<http://www.cs.huji.ac.il/~danix/itm/itm.pdf>>, 8 pages.

Lombaert, et al, "A Multilevel Banded Graph Cuts Method for Fast Image Segmentation", IEEE ICCV, 2005, pp. 1-7.

"MAXFLOW", retrieved Aug. 27, 2008 at <<http://www.adastral.ucl.ac.uk/~vladkolm/software.html>>, Software, pp. 1-2.

Mortensen, et al, "Intelligent Scissors for Image Composition", ACM Siggraph, 1995, pp. 1-8.

"Natural Image Colorization", retrieved on Feb. 17, 2009 at <<http://luanqing1021.googlepages.com/ColorEGSR07.pdf>>, Eurographics Symposium on Rendering, Eurographics Association, 2007.

Paragios, et al, "Geodesic Active Contours and Level Sets for the Detection and Tracking of Moving Objects", retrieved at <<http://meip6sb.alablu-t.u-tokyo,ac.jp/~shino/scanned_paper/$00_{13}$ 01/GeodesicActiveContours.pdf>>, IEEE, vol. 22, No. 3, Mar. 2000, pp. 266-280.

Perona, et al, "Scale-Space and Edge Detection Using Anisotropic Diffusion", IEEE Transactions on Pattern Analysis and Machine Intelligence, vol. 12, No. 7, Jul. 1990, pp. 629-639.

Pham, et al, "Separable Bilateral Filtering for Fast Video Preprocessing", IEEE International Conference on Multimedia and Expo, 2005, pp. 1-4.

Rother, "GrabCut—Interactive Foreground Extraction using Iterated Graph Cuts", retrieved at <<http://research.microsoft.com/vision/cambridge/papers/siggraph04.pdf, Microsoft Research, pp. 1-6, Dec. 2004.

Rother, et al, "Cosegmentation of Image Pairs by Histogram Matching—Incorporating a Global Constraint into MRFs", retrieved at <<http://research.microsoft.com/vision/cambridge/papers/carrot_CVPRO6.pdf>>, Microsoft, pp. 1-8, Dec. 2006.

Rother, "Optimizing Binary MRFs via Extended Roof Duality", IEEE CVPR, 2007, pp. 1-8.

Sethian, "Fast Marching Methods", retrieved on Feb. 17, 2009 at <<http://www.math.berkeley.edu/~sethian/2006/Papers/sethian.siam_fast.pdf>>, Department of Mathematics, University of California, Berkeley, Nov. 11, 1998, pp. 1-55.

Sigg, et al., "Signed Distance Transform Using Graphics Hardware", retrieved on Feb. 17, 2009 at <<http://delivery.acm.org/10.1145/1090000/1081456/20300012.pdf?key1=1081456&key2=0948394321&coll=GUIDE&dl=GUIDE&CFID=22489081&CFTOKEN=15169123>>, Proceedings of the 14th IEEE Visualization Conference (VIS 2003), IEEE, 2003, pp. 83-90.

Sinop, et al, "A Seeded Image Segmentation Framework Unifying Graph Cuts and Random Walker Which Yields a New Algorithm", retrieved at <<http://www.ieeexplore.ieee.org/iel5/4408818/4408819/04408927.pdf?tp=&isnumber=4408819&arnumber=4408927>>, IEEE, 2007, pp. 1-8.

Surazhsky, et al., "Fast Exact and Approximate Geodesics on Meshes", retrieved on Feb. 17, 2009 at <<http://research.microsoft.com/en-us/um/people/hoppe/geodesics.pdf>>, 8 pages.

Szczepanski, et al., "On the geodesic paths approach to color image filtering", Elsevier, 2003, pp. 1309-1342.

Szeliski, et al, "A Comparative Study of Energy Minimization Methods for Markov Random Fields", retrieved at <<http://www.wisdom.weizmann.ac.il/~mica/CVspring06/papers/optimization_I/Zabih%20comparative%20study.pdf>>, Microsoft Research, pp. 1-17, 2006.

Toivanen, "New Geodesic Distance Transforms for Gray-Scale Images", Pattern Recognition Letters 17, 1996, pp. 437-450.

Tomasi, et al, "Bilateral Filtering for Gray and Color Images", Proceedings of the 1998 IEEE International Conference on Computer Vision, 1998, 8 pages.

Tsitsiklis, "Efficient Algorithms for Globally Optimal Trajectories", retrieved on Feb. 17, 2009 at <<http://web.mit.edu/jnt/www/Papers/J058-95-jnt-traj.pdf>>, IEEE Transactions on Automatic Control, vol. 40, No. 9, Sep. 1995, pp. 1528-1538.

Unger, et al., "TVseg—Interactive Total Variation Based Image Segmentation", retrieved on Feb. 17, 2009 at <<http://www.icg.tugraz.at/pub/pdf/seg_bmvc08>>, 10 pages.

Veksler, "Efficient Graph-Based Energy Minimization Methods in Computer Vision", retrieved at <<http://citeseer.ist.psu.edu/cache/papers/cs/24543/http:zSzzSzwww.neci.nj.nec.comzSzhomepageszSzolgazSzthesis.pdf/veksler99efficient.pdf>>, A Dissertation Presented to the Faculty of the Graduate School of Cornell University in partial Fulfillment of the Requirements for the Degree of Doctor of Philosophy, Aug. 1999, pp. i-ix, 1-90.

Veksler, "Stereo Correspondence by Dynamic Programming on a Tree", retrieved on Feb. 17, 2009 at <<http://www.csd.uwo.ca/faculty/olga/Papers/cvpr05.pdf>>, pp. 1-7.

Wang, et al., "Interactive Video Cutout", retrieved on Feb. 17, 2009 at <<http://www.cs.washington.edu/homes/juewang/juew/VideoCutout2005.pdf>>, 10 pages.

Wang, et al, "Video Tooning", ACM Siggraph, 2004, pp. 1-10.

Weiss, et al, "Fast Median and Bilateral Filtering", ACM Siggraph, 2006, pp. 519-526.

"Welcome to UCL's Adastral Park Postgraduate Research Teaching Campus", retrieved Feb. 28, 2008 at <<http://www.adastral.ucl.ac.uk/>>, Adastral Park Postgraduate Research Campus, 2008, pp. 1-2.

Winnemoller, et al, "Real-Time Video Abstraction", ACM Siggraph, 2006, pp. 1-6.

Yatziv, et al, "Fast Image and Video Colorization Using Chrominance Blending", IEEE Transactions of Image Processing, vol. 15, No. 5, May 2006, pp. 1120-1129.

Yatziv, et al, "Q(N) Implementation of the Fast Marching Algorithm", Journal of Computational Physics 212, 2006, pp. 1-10.

Zitnick, et al, "High-Quality Video View Interpolation Using a Layered Representation", retrieved at <<http://www.cs.ucl.ac.uk/staff/s.prince/4C75/ZitnickSig04.pdf>>, Interactive Visual Media Group, Microsoft Research, pp. 1-9, Dec. 2004.

Office Action for U.S. Appl. No. 12/126,302, mailed on May 16, 2011, Antonio Criminisi, "Geodesic Image and Video Processing".

Office Action for U.S. Appl. No. 12/126,302, mailed on Oct. 18, 2011, Antonio Criminisi, "Geodesic Image and Video Processing", 12 pgs.

* cited by examiner

| 1=NW | 2=N | 3=NE |
|------|-----|------|
| 8=W  | 0   | 4=E  |
| 7=SW | 6=S | 5=SE |

IMAGE PROCESSING USING GEODESIC FORESTS

BACKGROUND

Nowadays high resolution images and videos are ubiquitous. Yet image processing systems for editing such data are typically not fast enough to allow real-time processing. For example, many modern image and video editing systems require spatially variant (2D or higher dimensional) processing which is typically complex, resource intensive and time consuming. One of the most sought after requirements is edge-sensitivity whereby the image processing system is able to change its behavior depending on the local image contrast. This can also be referred to as contrast-sensitive image and video editing or processing. Such dependence on the data content limits the speed of current image processing systems.

At present image editing systems typically use a variety of different approaches to achieve different image editing tasks. These tasks typically need to be carried out separately on an image or video without the ability to reuse results achieved during one task as part of the method for another task. However, there is a need to unify previously diverse image editing techniques in such a manner that at least some processing may be shared between tasks so that computational resource requirements may be reduced.

There is also a need to provide new image and video editing ability as well as to improve, enhance and speed up existing image and video editing systems.

The embodiments described herein are not limited to implementations which solve any or all of the disadvantages of known image or video editing and processing systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Image processing using geodesic forests is described. In an example, a geodesic forest engine determines geodesic shortest-path distances between each image element and a seed region specified in the image in order to form a geodesic forest data structure. The geodesic distances take into account gradients in the image of a given image channel such as intensity, color, or other channels. In some embodiments, a 1D processing engine carries out 1D processing along the branches of trees in the geodesic forest data structure to form a processed image. For example, effects such as ink painting, edge-aware texture flattening, contrast-aware image editing, generating animations using geodesic forests and other effects are achieved using the geodesic forest data structure. In some embodiments the geodesic forest engine uses a four-part raster scan process to achieve real-time processing speeds and parallelization is possible in many of the embodiments.

Many of the attendant features will be more readily appreciated as the same become better understood by reference to the following detailed description considered in connection with the accompanying drawings.

DESCRIPTION OF THE DRAWINGS

The present description will be better understood from the following detailed description read in light of the accompanying drawings, wherein:

FIG. 3 shows 9 back-link indices;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image processing system for edge-aware processing of individual images, the system described is provided as an example and not a limitation. As those skilled in the art will appreciate, the present examples are suitable for application in a variety of different types of image and video processing systems.

The term "image editing" is used herein to refer to computer-implemented processes applied to images or videos and where those processes can proceed without the need for user input.

The term "geodesic distance" is used herein to refer to a distance between two points in an image which takes into account image content. For example, consider the intensities of the image elements as a height map. The shortest geodesic distance between two points in an image may then be one that travels around a region of high intensity rather than a Euclidean shortest path which travels "as the crow flies". In the embodiments described herein the geodesic distances take into account intensity gradients in an image. However, it is also possible to use geodesic distances which take into account gradients of other sources of information, such as texture gradients, colour gradients, or gradients of probability maps.

The term "image element" is used to refer to a pixel, group of pixels, or other higher level component of an image.

Figure 1:
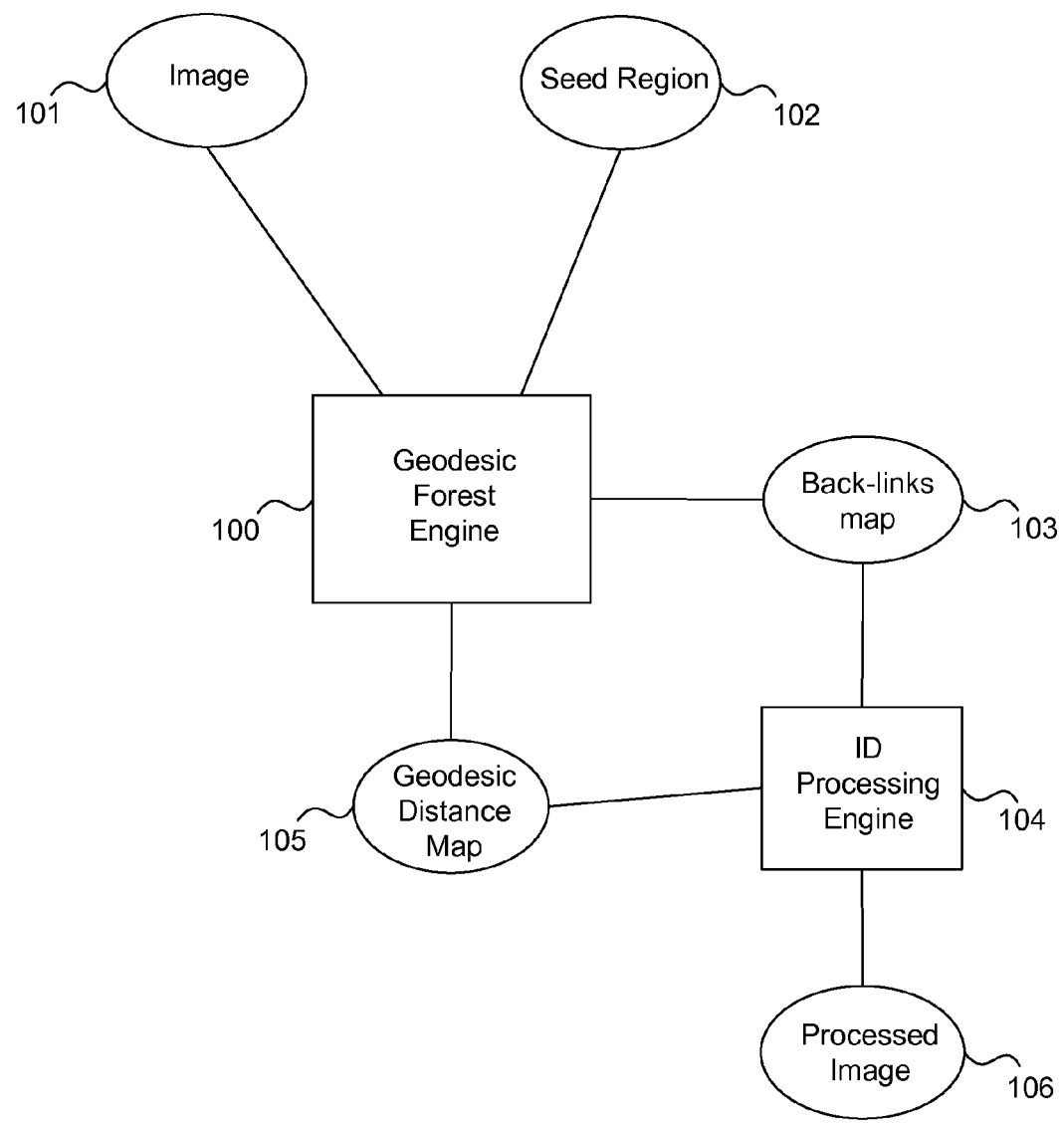
FIG. 1 is a schematic diagram of an image and/or video processing system.

FIG. 1 is a schematic diagram of an image processing system comprising a geodesic forest engine 100 and a 1D processing engine 104. An image or sequence of images in the case of a video, is provided as input 101 to the system. The image may be a colour image, a grayscale image, a medical image or any other type of image. Also, the input image may have more than 2 dimensions. For instance it can be a 3D medical volume or a video (a space-time parallelepiped). Also available to the geodesic forest engine 100 is a seed region 102 which may be provided as an input or may be computed automatically by the geodesic forest engine without the need for user input. It is also possible for the seed region to be computed by the geodesic forest engine using some user input.

The geodesic forest engine processes the image 101 to form a new representation of that image stored in a new kind of data structure at the geodesic forest engine 100 or another suitable location. The new representation is referred to herein as a geodesic forest. This representation may comprise a back-links map 103 and/or a geodesic distance map 105. The geodesic forest representation is made available to a 1D processing engine 104 which carries out 1D processing on the data structure to produce a processed image 106. The 1D processing engine 104 is arranged to carry out one or more types of one-dimensional operation on the geodesic forest representation. The geodesic forest data structure thus enables contrast-sensitive editing tasks to be achieved by simple, fast and effective processes acting on the same tree-based representation. This unifies previously diverse image editing techniques. It also allows the work done to form the geodesic forest data structure to be re-used by the 1D processing engine for any particular processing task that 1D processing engine undertakes.

Figure 2:
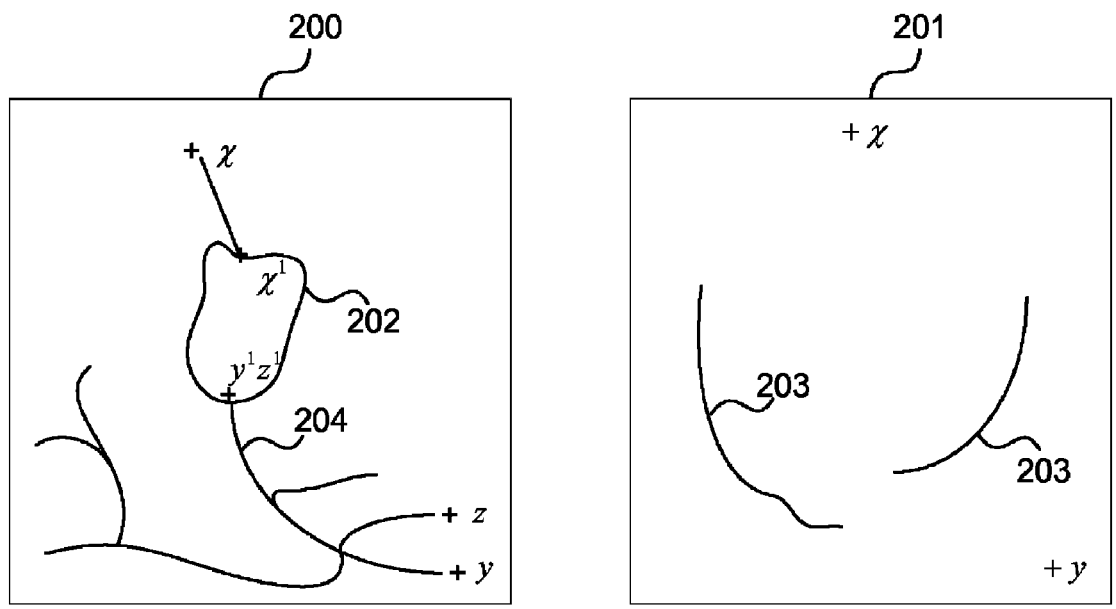
FIG. 2 is a schematic diagram of a geodesic distance map of an image and an intensity gradient map of the same image.

FIG. 2 illustrates schematically an intensity gradient map 201 of an image and a geodesic distance map 200 of the same image. A seed region 202 is illustrated in the geodesic distance map 200. This seed region 202 may be a single point in some examples. In other examples it may be a defined image region such as provided by a binary segmentation mask or in any other manner. In other examples, the seed region 202 is "soft" in that it is defined probabilistically. In this case a probability distribution is used to model the belief that a given image element belongs to the seed region.

In some examples the seed region is associated with an object of interest in the image such as a foreground object region. In these cases the resulting geodesic forest representation may comprise a "blank" region corresponding to the seed region. The 1D processing engine is then able to easily selectively process background regions of the image outside the foreground seed region. However, this is not essential.

The intensity gradient map 201 indicates regions in the image where the intensity values change rapidly and these are shown as lines 203. The process of forming a geodesic forest corresponding to the image comprises finding, for each image element, the shortest geodesic distance to the seed region 202. For point x in FIG. 2 this corresponds to a Euclidean distance from x to point x' because there are no high intensity gradients to cross. However, the shortest geodesic distance from point y to the seed region 202 is a curved line from y to y' in FIG. 2 because the path needs to travel between the high intensity gradient lines 203. This is also the case for image element z which has a curved shortest geodesic distance to z' on the seed region. In this way branches of image elements are formed as illustrated in FIG. 2. These branches form a tree which has a root at point y'. Many other such trees are formed in this way, each tree having a root which is a point on the seed region. Each image element is then a member of only one of the trees. The set of trees covers the entire image because each pixel belongs to at least one tree. The set of trees that covers the entire image is referred to herein as a geodesic forest. The number of trees in the forest is automatically selected by the geodesic forest engine.

Figure 3:
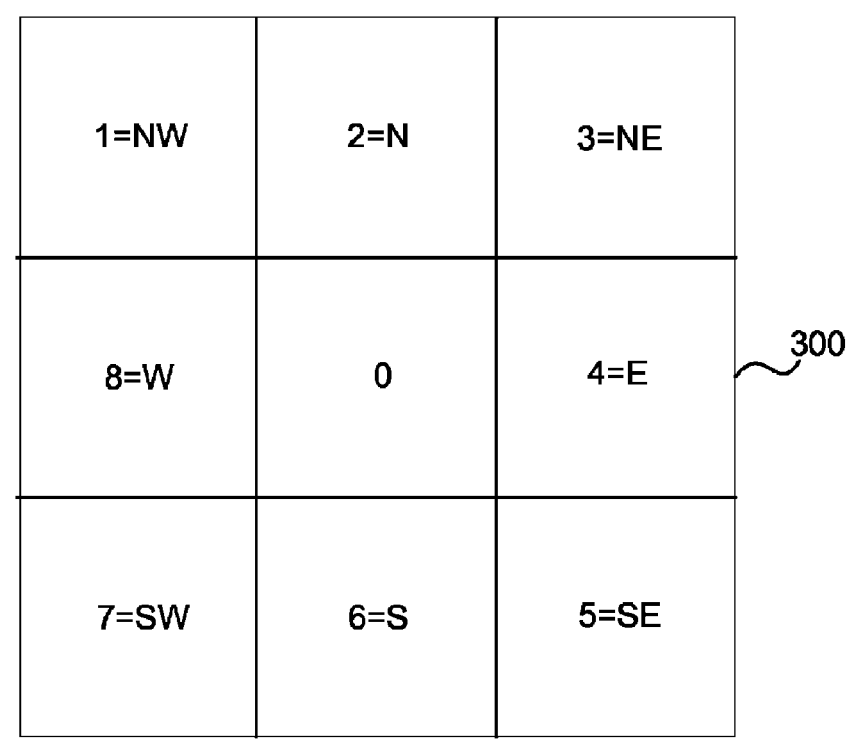
Figure 4:
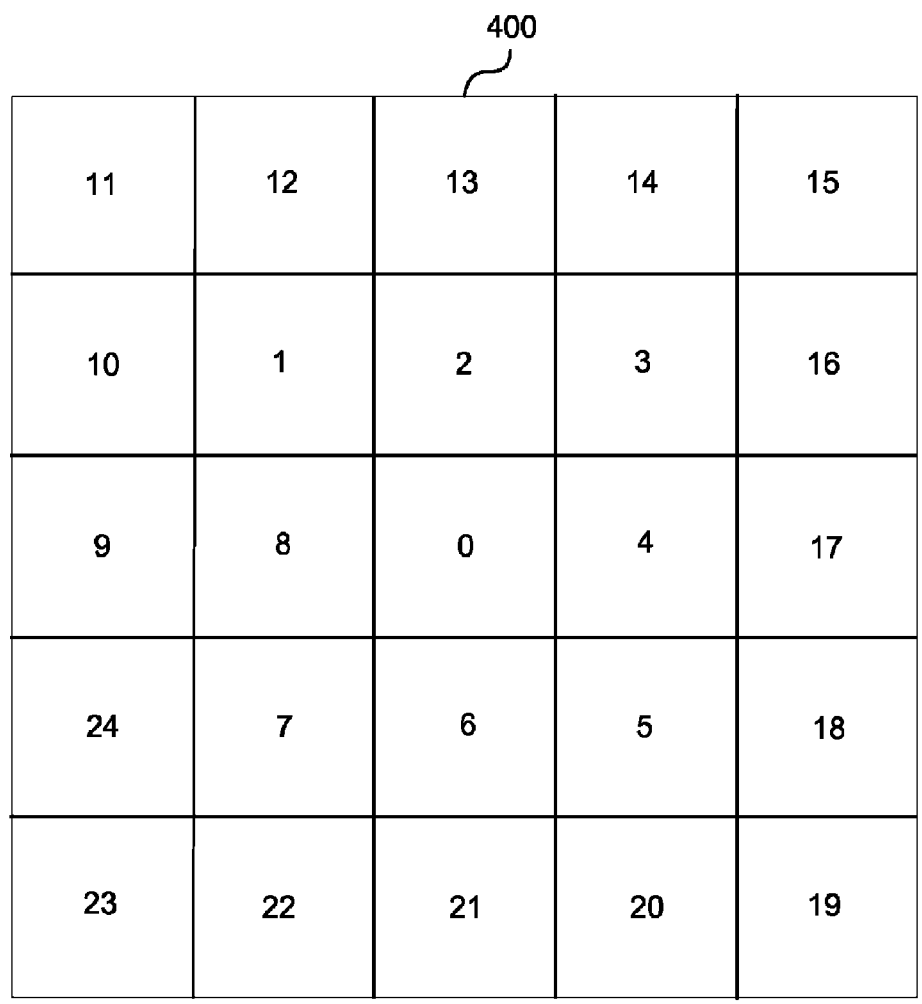
FIG. 4 shows 25 back-link indices.

Once the geodesic shortest distance to the seed region is computed for each image element a geodesic map may be stored having a distance value at each image element. Furthermore, a back-link value at each image element may also be stored FIG. 3 shows 9 back-link indices 300. Starting from an image element if the next image element in the geodesic tree in the direction towards the root is in the direction north, then the back-link index 2 is stored at that image element location. This process is repeated so that a back-link index is stored at each image element location to form a back-links map. It is also possible to use 25 back link indices 400 as illustrated in FIG. 4 or any other back-link index scheme.

In some embodiments the geodesic forest data structure comprises only the back-links map and the details of the back-link index scheme used are available to the geodesic forest engine and the 1D processing engine. In other embodiments the geodesic forest data structure comprises only a geodesic map having a distance value for each image element. In other embodiments both the distances and the back-links are stored.

As mentioned above, in some embodiments the seed region is defined exactly. In these cases a geodesic distance transform may be used to determine the geodesic distances. Any suitable geodesic distance transform (GDT) may be used and an example of a known geodesic distance transform is set out below for ease of reference.

Given a color image $I(x): \Psi \subset R^2 \rightarrow R^3$, a binary mask M (with $M(x) \in \{0,1\} \forall x$) and a "seed" region (or "object" region) $\Omega$ with $x \in \Omega \Leftrightarrow M(x)=0$, the unsigned geodesic distance of each pixel x from $\Omega$ is defined as:

$$D(x; M, I) = \min_{\{x'|M(x')=0\}} d(x, x'), \text{ with} \quad (1)$$

$$d(a, b) = \inf_{\Gamma \in P_{a,b}} \int_0^1 \sqrt{|\Gamma'(s)|^2 + \gamma^2 \nabla I (s) \cdot \Gamma'(s)^2} ds. \quad (2)$$

with $P_{a,b}$ the set of all possible paths between the points a and b; and $\Gamma(s): R \rightarrow R^2$ indicating one such path, parameterized by the scalar $s \in [0,1]$. The spatial derivative $\Gamma'(s)=\partial\Gamma(s)/\partial s$ represents a vector tangent to the direction of the path. The dot-product in (2) ensures maximum influence for the gradient $\nabla I$ when it is parallel to the direction of the path $\Gamma$. The geodesic factor $\gamma$ weighs the contribution of the image gradient versus the spatial distances. Furthermore, the integral in (2) is the Euclidean length of the 3D path $\tilde{\Gamma}$ that $\Gamma$ defines on the (x,y,I) surface: $\tilde{\Gamma}(s)=[\Gamma(s);\gamma I(\Gamma(s))]$. Also, for $\gamma=0$ eq. (2) reduces to the Euclidean length of the path $\Gamma$.

In other embodiments the seed region is defined probabilistically. In these embodiments a generalized geodesic distance transform (GGDT) may be used such as that described in Criminisi et al. 2008 "Geos: Geodesic image segmentation," In ECCV which is incorporated herein by reference in its entirety.

A key difference between GDT and GGDT is the fact that in the latter the input seed map M is more generally a soft, real-valued matrix. Given a map M(x) ∈ [0,1] the Generalized Geodesic Distance is defined as follows:

$$D(x; M, I) = \min_{x' \in \Psi}(d(x, x') + vM(x')) \quad (3)$$

with d(·) as in (2). The fact that eq. (3) uses the soft belief of a pixel belonging to the object of interest means that the latter can be defined probabilistically. This is achieved more economically than having to compute the fully optimized binary segmentation. The Parameter v in eq. (3) establishes the mapping between the beliefs M and the spatial distances. Alternatives to eq. (3) (e.g. minimizing the distance $\sqrt{d^2(x,x')+vM^2(x')}$) may also be used.

Larger values of the geodesic factor γ yield fewer trees with bendier and more convoluted branches.

Any suitable methods may be used by the geodesic forest engine to compute the geodesic distances. For example, in cases where the seed region is defined exactly a GPU algorithm for computing geodesic distances may be used such as that described in Weber et al. 2008 "parallel algorithms for approximation of distance maps on parametric surfaces", in ACM SIGGRAPH, which is incorporated herein by reference in its entirety.

In the case that the GGDT is used then a new GPU algorithm may be used as now described. Parallelization of a four-pass raster scan technique is used. The raster scans are organized so that a block of threads may proceed in parallel. Multiple blocks are overlapped and may also proceed in parallel. The data is organized to use texture memory for the immutable image/and global memory accessed coherently for the distance map D. Four passes (up, down, left and right) are completed for each iteration of the algorithm. Two copies of the distance map are used: one for the up/down passes, and a transposed version for the left/right passes. The distance map is initialized from the soft seed mask as follows: D(x)= vM(x). The raster scans are the executed so that each pixel is replaced by the minimum of four values:

$$D(x) = \min \begin{cases} D(x) \\ D(x + a_1) + \sqrt{2\rho^2 + \gamma^2|I(x) - I(x + a_1)|^2} \\ D(x + a_2) + \sqrt{\rho^2 + \gamma^2|I(x) - I(x + a_2)|^2} \\ D(x + a_3) + \sqrt{2\rho^2 + \gamma^2|I(x) - I(x + a_3)|^2} \end{cases} \quad (6)$$

The three offset vectors $\alpha_i$ define the local kernel and vary for each scan direction. For example, in the downward pass $\alpha_1=(-1,-1), \alpha_2=(0,-1), \alpha_3=(+1,-1)$. The parameter ρ represents the spatial scale in the image plane and is fixed to ρ=1. This implementation is augmented with an additional output of one byte per pixel, to store the incoming direction from which the minimum distance in eq. (6) is achieved. This back-links map B(x) is initialized to zero and for each pass, one of three possible direction indices is written at each pixel, depending on which term in eq. (6) gives rise to a minimum. For example in the left pass, direction indices of 3-5 are used (see FIG. 3). In each pass, if the distance stored at a pixel remains unchanged by the minimum operation, then the back-link value is not altered either. As with the distance map, two mutually transposed versions of the back-links map are maintained for memory access coherence. After executing all four passes, the values in B trace minimum cost paths for each position x.

Figure 5:
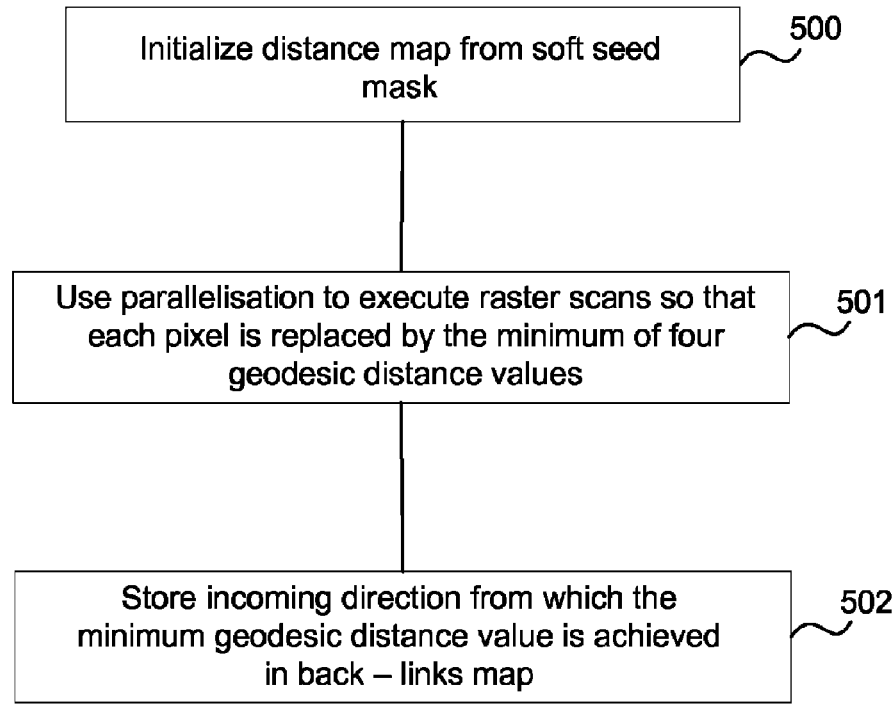
FIG. 5 is a flow diagram of a method of creating a back-links map.

In summary, with reference to FIG. 5, a geodesic distance map is initialized 500 from a soft seed mask. Parallelization is used to execute raster scans so that each pixel is replaced by the minimum of four geodesic distance values 501. The incoming direction from which the minimum geodesic distance value is achieved is then stored 502 in a back-links map.

Figure 6:
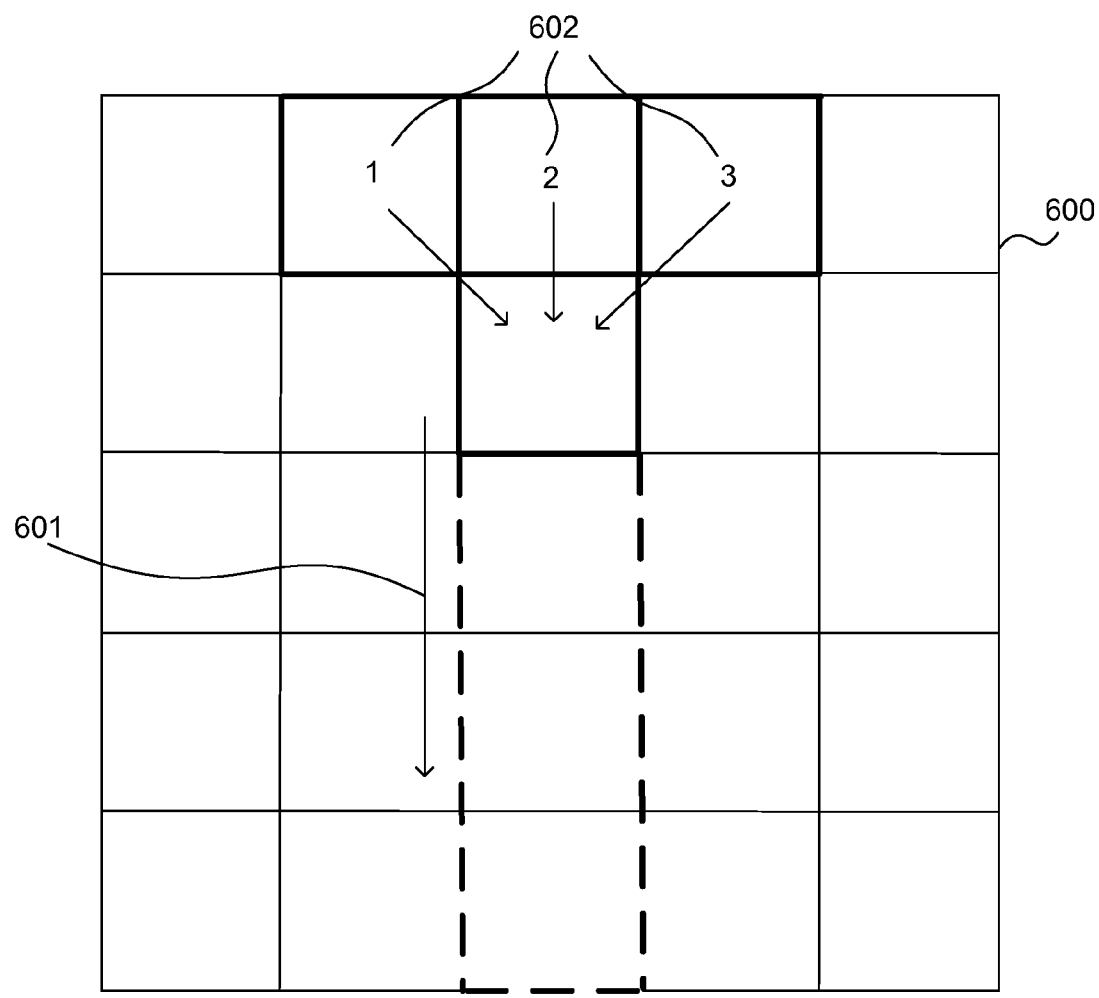
FIG. 6 is schematic diagram of a downward pass in a geodesic forest representation formation process.

FIG. 6 shows a grid of pixels 600 and illustrates the downward pass of a raster scan as indicated by arrow 601. The dotted lines show the pixels processed by the current thread. The distance values in the top row have already been computed. Distances along the arrows are computed from texture reads on the image I as in equation 6.

Figure 7:
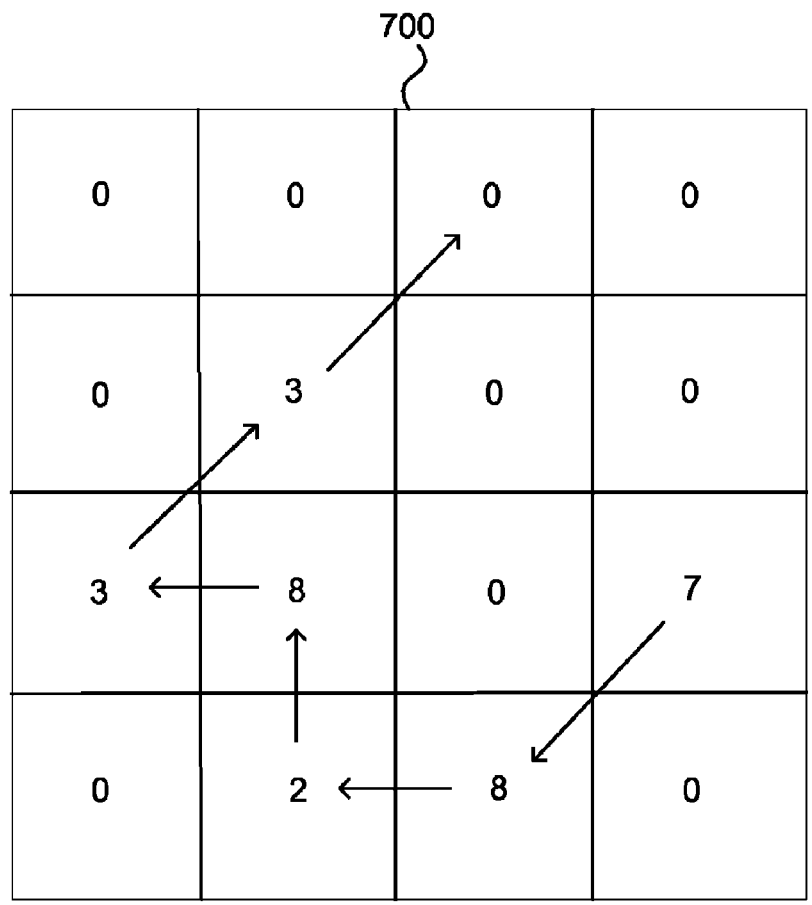
FIG. 7 is an example of tracing a path of minimum geodesic distance using back-links in part of a back-links map.

FIG. 7 shows part of a back-links map 700 and the arrows indicate how a path of minimum distance is traced using the back-links together with the back-link index scheme of FIG. 3. Starting at the image element location with back-link index 7, this value indicates that the direction south west should be taken which leads to back-link index 8. That value indicates that the direction west should be taken. That leads to back-link index 2 and so on.

It is found that using an nVidia GeForce 280 GTX (trade mark) this method enables a geodesic distance map and a back-links map to be computed in under 50 msecs for a 7 Mpixel grid.

As mentioned above the seed region 102 (also referred to as the seed map) may be provided in a variety of different ways.

In some embodiments the seed region corresponds to an actual object and is determined interactively. For example, given an image of a flower a user may use different brush strokes to quickly indicate a foreground object as described in Li et al 2004 "Lazy snapping" in ACM Trans. Graph, 23, 3 which is incorporated herein by reference in its entirety. In this case the user strokes are used to compute the foreground (Fg) and background (Bg) color models, which are represented as the histograms $h_{Fg}$, $h_{Bg}$ over the 3D RGB domain. At this point, for each pixel x in the image the log-likelihood ratio is computed as:

$$L(x)=\log(h_{Fg}(c(x))/h_{Bg}(c(x))) \quad (4)$$

where c(x) represents the RGB color for the pixel in x as a 3-vector. Now, the real-valued seed map M is obtained via a sigmoid transformation of the log-likelihood ratio as $$M(x)=\sigma(L(x)), \text{ with } \sigma(L)=1/(1+\exp(-L/\mu)). \quad (5)$$

This operation ensures that M(x) ∈ [0,1].

In other embodiments the seed region is determined automatically by the geodesic forest engine 100 without the need for user input. An example of this is now explained with reference to FIG. 8.

Figure 8:
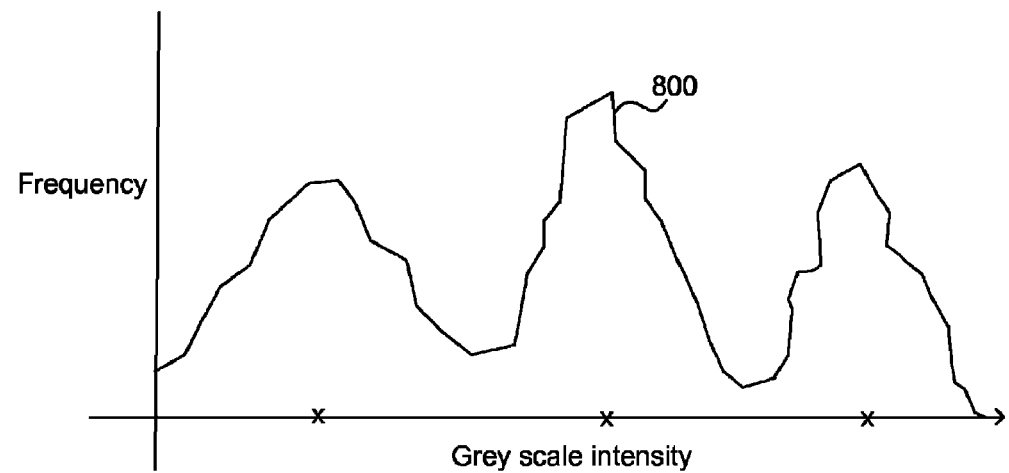
FIG. 8 is a schematic diagram of an image histogram and showing how soft seed regions are automatically generated and used to form a geodesic forest representation of the image.
Figure 8:
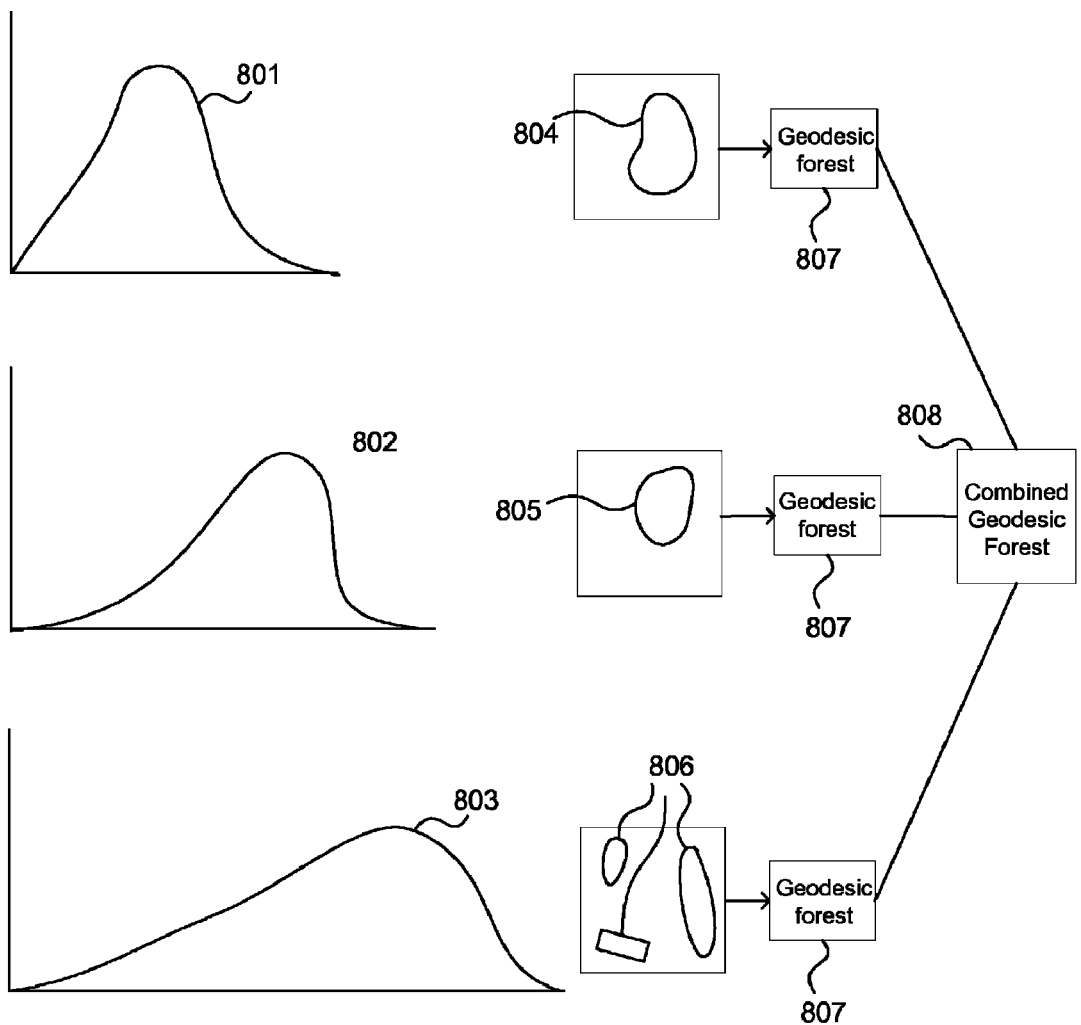

An input image (such as a grayscale image in this example) is received by the geodesic forest engine 100 and used to form a histogram such as 800 in FIG. 8 which plots frequency of image elements against grayscale intensity. In this example, the histogram has three peaks although in practice the histogram may have any form. The geodesic forest engine is arranged to carry out a cluster analysis on the histogram and any suitable type of clustering process may be used. For example, k-means clustering, agglomerative clustering, or other methods. In this example, three clusters are identified by the K-means clustering process, each cluster comprising a probability distribution 801, 802, 803 representing belief that an image element belongs to that cluster. Each of those probability distributions specifies a corresponding soft seed region 804, 805, 806 and it is noted that the soft seed regions need not be contiguous. Each soft seed region may then be used to form its own geodesic forest representation of the input image and these are illustrated schematically in FIG. 8 as 807. Those individual geodesic forest representations may then be combined into a single geodesic forest representation 808. The process of forming the individual geodesic forest representations 807 may be carried out independently from one another and in parallel. For many practical applications it is found that four or fewer clusters provide good results.

The branches of a geodesic forest are, by construction, paths of minimum cost and may be interpreted as paths of least resistance through an inhomogeneous, physical medium. Geodesic forests may then be used to simulate physical phenomena such as electrical conduction, fluid propagation, magnetism and diffusion.

An example of image editing to simulate diffusion of paint or other color medium over an inhomogeneous surface (such as a carved surface) is now described with reference to FIG. 9. This method is computer-implemented and may proceed without the need for user input. A seed mask is formed 900 and stored at an image processing system. For example, this seed mask comprises a blank image with a region of color representing a blob of paint. The seed mask specifies the seed region either specifically or in a probabilistic manner. An image of an inhomogeneous surface is received 901 which simulates a carved surface, or other surface with 3D texture. A geodesic forest is formed 902 on the basis of the received image and the seed mask. The 1D processing engine (104 in FIG. 1) uses the formed geodesic forest to compute 903, at each image element position, a weight related to the geodesic distance and a diffusion parameter. The diffusion parameter may be pre-configured or may be user-specified. The computed weights are used to construct 904 a diffused image from the received image of the inhomogeneous surface. For example, if the inhomogeneous surface represents a piece of wood carved to show a plant growing away from a central region corresponding to the seed region, the constructed image may show the paint diffused along the plant with the density of paint reducing with distance away from the seed region.

Figure 9:
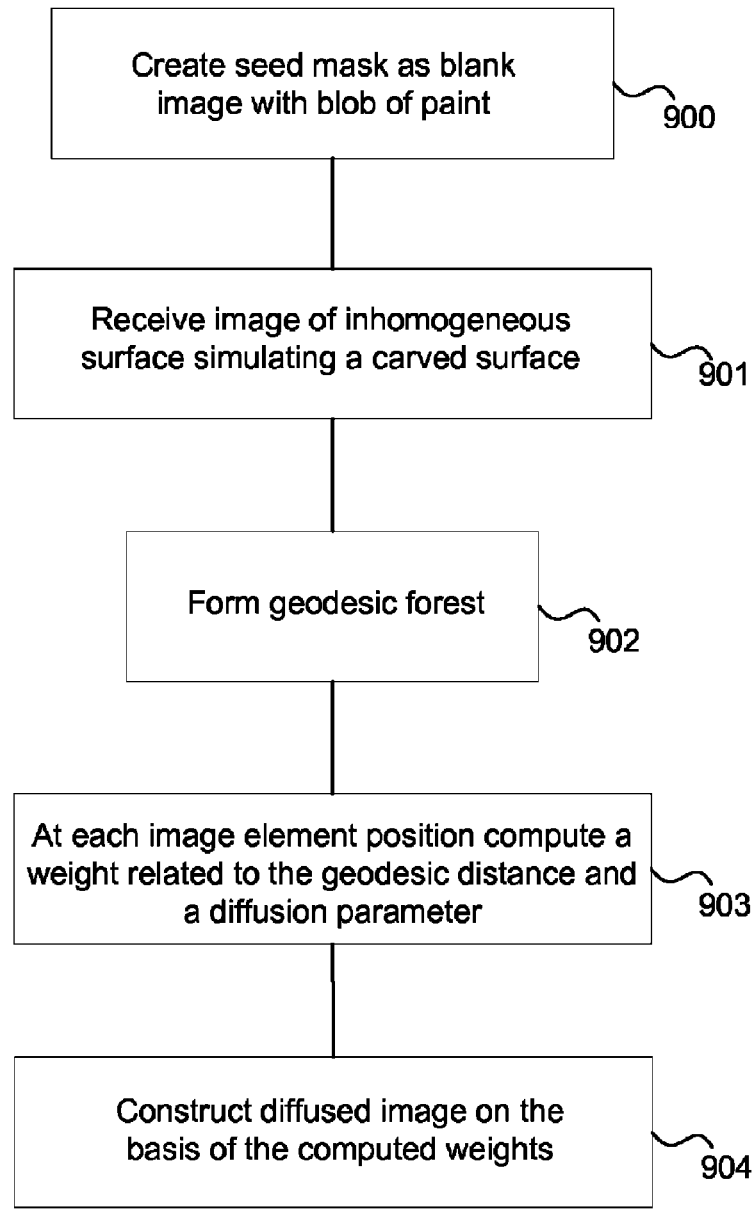
FIG. 9 is a flow diagram of a method of image editing for diffusive painting.

An example of the method of FIG. 9 is now described in more detail. A seed mask M is defined as a blank image with a single blob of paint placed in the middle of the carved region. The gradient field ∇I is defined as the gradient of the carved surface.

Forming a Geodesic Forest data structure produces a number of trees with roots in the initial paint location. Diffusing paint along the tree braches, from the root towards the leaves amounts to computing the weight $$W(x) = Ze^{-\frac{D^2(x)}{\phi^2}} \quad (7)$$

with Z a normalization constant which ensures that W ∈ [0,1], and φ a user-defined diffusion parameter. The quantity W(x) is a function of the amount of paint which reaches position x. Then the diffused image is constructed as $$I(x) = W(x)S(x) + (1-W(x))C$$

with S(x) the original surface colour and the constant C the color of the paint. The diffusion parameter φ controls the spatial extent of the diffusion process, with larger values of φ yielding spatially larger diffusion effects. Paint thinning can also be simulated by multiplying W by a function of the area affected by diffusion.

Geodesic forest image representations may be used in many other image and video editing processes. For example, those in which it is required to diffuse information from one image region to other regions anisotropically and efficiently.

Figure 10:
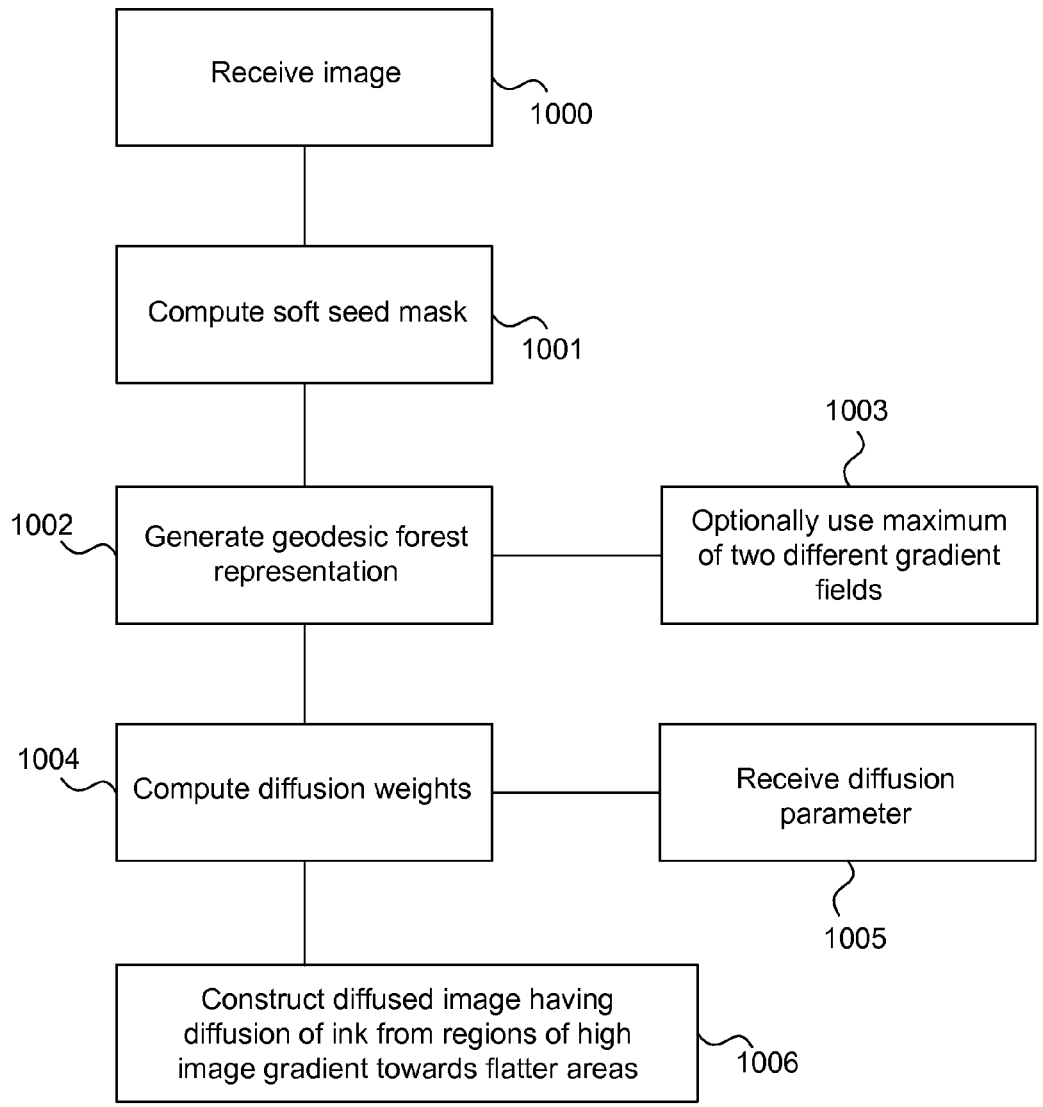
FIG. 10 is a flow diagram of a method of image editing for diffusive ink painting.

In some examples image or video editing for simulating ink painting is provided. This is now explained with reference to FIG. 10. This method is computer-implemented and may proceed without the need for user input. An image is received 1000 and is used to automatically compute 1001 a soft seed mask using any suitable method. A geodesic forest representation of the image is then computed 1002 as described herein. Optionally the maximum of two different gradient fields is used 1003 during the formation of the geodesic forest representation. This may be considered as using two gradient maps (201 FIG. 2) one for the received image and another representing the 3D texture of paper, card or other surface onto which it is required to simulate the effect of having painted the received image onto that surface. A diffusion weight 1004 is computed for each image element position using the geodesic forest representation and a diffusion parameter 1005. A diffused image may then be constructed 1006 having a diffusion of ink from regions of high image gradient towards flatter areas. Optionally, automatic pen strokes may be added to the output image. These may be computed as the contrast-enhanced gradient magnitude of the original image.

Figure 11:
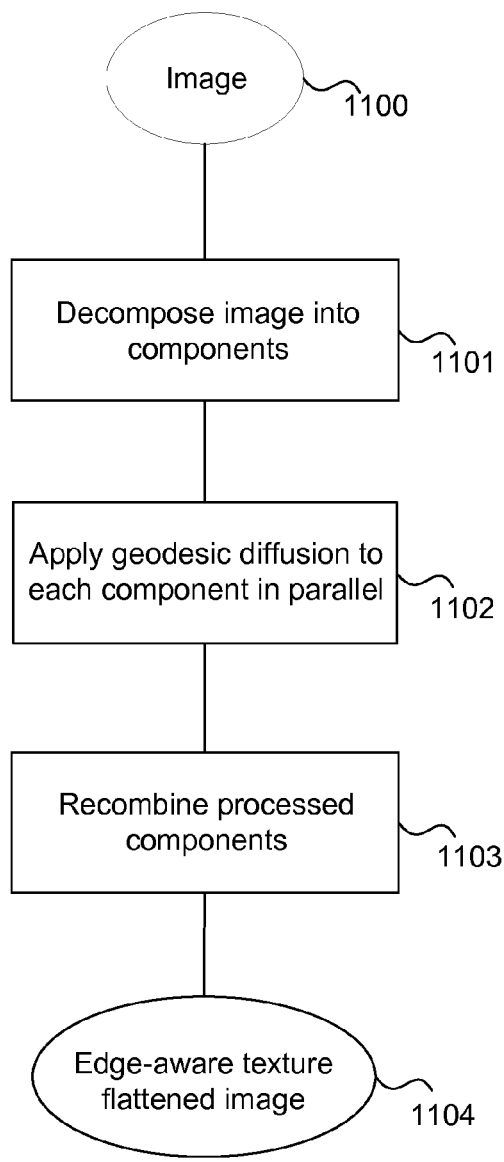
FIG. 11 is a flow diagram of a method of image editing for edge-aware texture flattening.

Image processing to achieve edge-sensitive texture flattening is now described with reference to FIG. 11. For example, this type of image processing may be used where it is required to remove graininess of some regions of an image whilst retaining sharp detail. The example method described with reference to FIG. 11 involves automatically computing the soft seed region using a method similar to that described with reference to FIG. 8. An image is received 1000 and decomposed 1101 into components, for example, using k-means clustering or other clustering methods as mentioned above with respect to FIG. 8. Geodesic diffusion is applied 1102 to each of the components, for example, using the geodesic diffusion method of FIG. 10 omitting step 1003. This process may be carried out in parallel for each of the components. The processed components are then recombined 1103 and the result is an edge-aware texture flattened image.

Another example of this type of edge-aware texture flattening process is now described in detail. Given a color change I and its luma Y all pixel intensities are clustered via conventional K-means into K cluster centres, with mean luma values denoted $\mu_i$ and corresponding standard deviations denoted $\sigma_i$ (i is a cluster index).

At this point, K soft masks $M_i(x)$ are computed as a function of the probability of each pixel belonging to the $i^{th}$ cluster as follows:

$$M_i(x) = 1 - \lambda_i e^{-\frac{1}{2}\left(\frac{Y(x)-\mu_i}{\sigma_i}\right)^2}$$

with $\lambda_i$ normalization constants. For each mask $M_i$ the corresponding distance $D_i(x)$ is found as in eq. (3) and thus the diffusion weights $W_i(x)$ following eq. (7). The flattened luma is obtained as a weighted average of the cluster colors:

$$Y'(x) = \sum_i^K \mu_i W_i(x).$$

Combining the flattened luma Y' with the unprocessed chromaticity channels yields an output color image. This operation may be interpreted in physical terms as constructing an image by pouring K paint shades onto a canvas in different regions and letting the paint diffuse and mix.

In this example the soft seed regions are computed automatically and the user may optionally select the amount of diffusion $\phi$ and the number of clusters K. It is found that for most applications four or fewer clusters give good results thus making the whole process extremely efficient. The reason why a very small number of cluster suffices (even on images with complex luma statistics) is due to the probabilistic nature of the GGDTs, which can take into account the uncertainty of pixels which do not fully belong to a single cluster and whose contribution is spread across multiple clusters.

The K distance maps may be computed completely independently from one another and in parallel. Also, the GPU-based GGDT algorithm described herein is itself parallel and extremely efficient. As an example, 1 Mpix images are flattened in about 30 ms, and 10 Mpix ones in about 160 ms. Notice that here no data sub-sampling has been necessary (thus avoiding possible loss of fine details, such as thin structures).

The geodesic forest data structure representation requires relatively small memory use (even for high res. Images), and no large speed reduction is observed for larger images. The GPU-based texture flattening technique allows abstraction and cartoonization of videos in real time.

Figure 12:
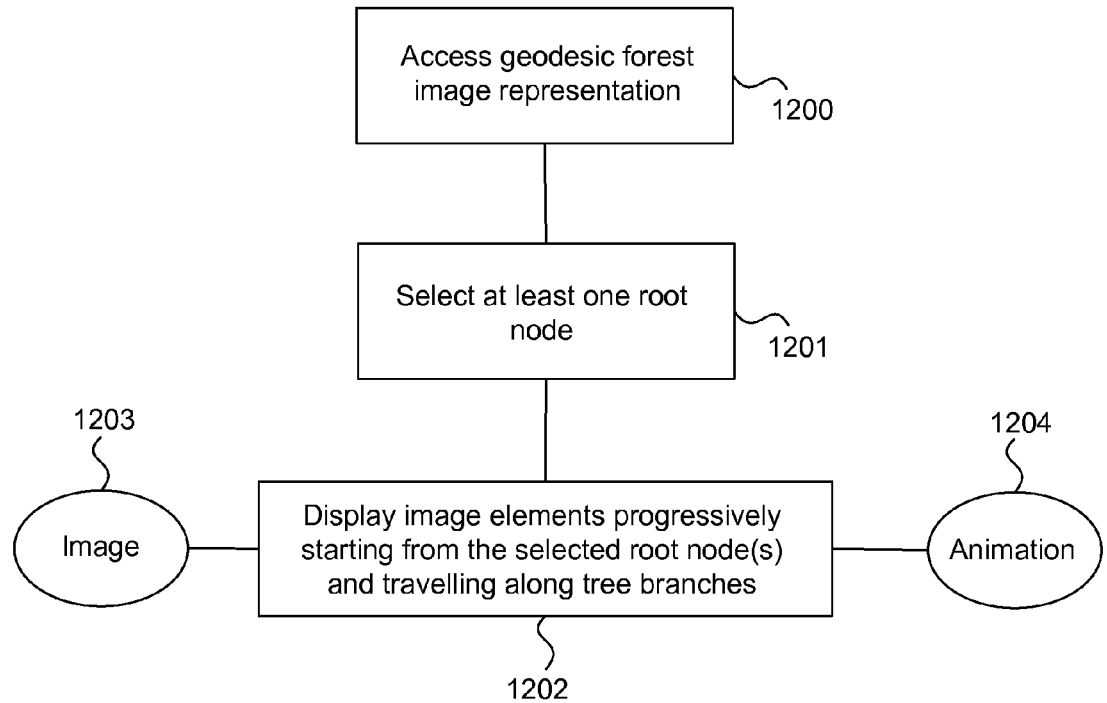
FIG. 12 is a flow diagram of a method of creating an animation using a geodesic forest image representation.

Interesting animations may be created by controlling display of image regions sequentially along the branches of the geodesic forest trees. For example, a geodesic forest image representation of an image is accessed 1200 as described in FIG. 12. At least one root node is selected 1201 from that geodesic forest and image elements are displayed progressively, starting from the selected root nodes and travelling along the tree branches 1202. This forms an animation 1204 from the input image 1203.

Figure 13:
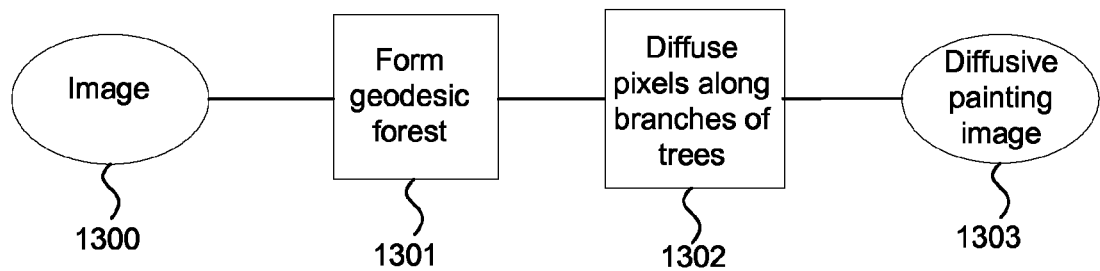
FIG. 13 is a flow diagram of another method of image editing for diffusive painting.

Another image processing technique using geodesic forest data structures can be referred to as diffusive painting. An example method is shown in FIG. 13 and comprises receiving an image 1300, forming a geodesic forest data structure 1301 from that image and diffusing pixels of that image along the branches of the trees in the geodesic forest 1302. This results in a diffusive painting image 1303. This technique may also be used to create animations in a similar manner to that described with reference to FIG. 12.

Figure 14:
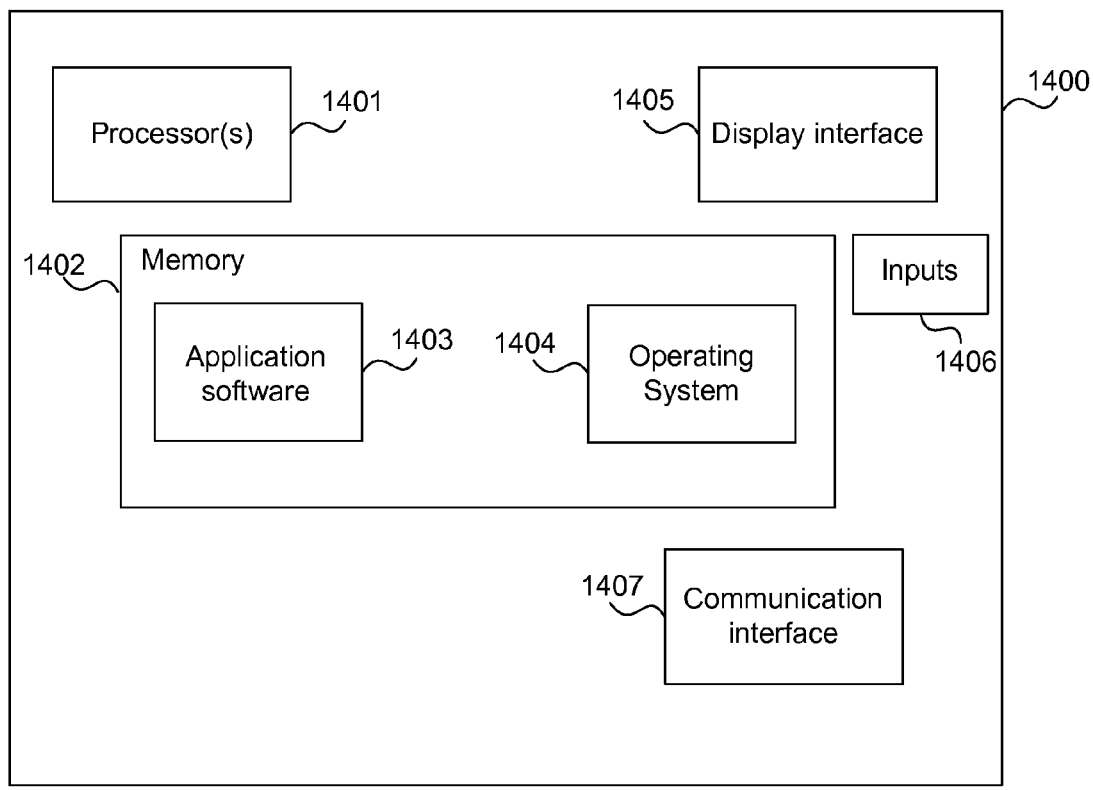
FIG. 14 illustrates an exemplary computing-based device in which embodiments of an image and/or video processing system may be implemented.

FIG. 14 illustrates various components of an exemplary computing-based device 1400 which may be implemented as any form of a computing and/or electronic device, and in which embodiments of an image processing system using geodesic forests may be implemented.

The computing-based device 1400 comprises one or more inputs 1406 which are of any suitable type for receiving media content, Internet Protocol (IP) input, images, videos, user input, audio input, or other types of input. The device also comprises communication interface 1407 to enable the device to communicate with one or more other entities in a communications network.

Computing-based device 1400 also comprises one or more processors 1401 which may be microprocessors, controllers or any other suitable type of processors for processing computing executable instructions to control the operation of the device in order to generate geodesic forest image representations and to use those for image processing. Platform software comprising an operating system 1404 or any other suitable platform software may be provided at the computing-based device to enable application software 1403 to be executed on the device.

The computer executable instructions may be provided using any computer-readable media, such as memory 1402. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The display system may provide a graphical user interface, or other user interface of any suitable type although this is not essential. For example, a display interface 1405 may be provided to enable a user interface to be controlled.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of processing an image, the method comprising:
   receiving an image to be processed;
   obtaining details of a seed region in the image; and
   creating, by at least one processor, a data structure holding a tree-based representation of the image which is related to geodesic distances of image elements in the image from the seed region;
   wherein the data structure comprises a direction for each image element location, that direction being a direction along a branch in the tree-based representation.

2. A method as claimed in claim 1 further comprising applying a 1D transformation to the tree-based representation and outputting the resulting processed image.

3. A method as claimed in claim 2, wherein the applying the 1D transformation includes computing a weight for each image element which is related to the geodesic distance of that image element and a diffusion parameter.

4. A method as claimed in claim 2, which further comprises diffusing image elements of the received image along branches of the tree-based representation.

5. A method as claimed in claim 1 further comprising automatically obtaining the seed region from the received image.

6. A method as claimed in claim 1, wherein the obtaining details of the seed region comprises obtaining a probability distribution describing belief about whether a given image element is a member of the seed region.

7. A method as claimed in claim 1 which is a method of contrast-sensitive image editing.

8. A method as claimed in claim 1, wherein the creating the data structure comprises computing one or more shortest-path geodesic distances of image elements in the image from the seed region.

9. A method as claimed in claim 1, wherein the creating the data structure comprises computing geodesic distances which take into account gradients in the image of a specified image modality.

10. A method as claimed in claim 1, wherein the creating the data structure comprises using a plurality of processors to compute geodesic distances in parallel.

11. A method as claimed in claim 10, further comprising carrying out a four part raster scan technique in order compute the geodesic distances in parallel.

12. A method as claimed in claim 1, wherein the creating the data structure holding the tree-based representation of the image comprises using two gradient fields, one being a gradient map of the received image and another different gradient field.

13. A method as claimed in claim 1, wherein the obtaining the seed region comprises automatically decomposing the received image into a plurality of components and processing those components in parallel.

14. A method as claimed in claim 1, which further comprises creating an animation by displaying image elements of the received image progressively on the basis of their relative corresponding location in the tree-based representation.

15. An image processing apparatus comprising:
   an input that receives an image to be processed;
   a memory having stored therein details of a seed region in the image;
   at least one processor that creates a data structure holding a tree-based representation of the image which is related to geodesic distances of image elements in the image from the seed region;
   a 1D processing engine that applies a 1D transformation to the tree-based representation; and
   an output that provides the resulting processed image.

16. An apparatus as claimed in claim 15 wherein the data structure includes a direction for each image element location, that direction being a direction along a branch in the tree-based representation.

17. An apparatus as claimed in claim 15 wherein the processor computes geodesic distances which take into account gradients in the image of a specified image modality.

18. An apparatus as claimed in claim 15 which comprises a plurality of processors arranged to compute geodesic distances in parallel.

19. One or more computer-readable storage media having stored thereon device-executable instructions for performing steps comprising:
   receiving an image to be processed;
   obtaining details of a seed region in the image; and
   creating a data structure holding a tree-based representation of the image which is related to geodesic distances of image elements in the image from the seed region;
   wherein the creating the data structure comprises using a plurality of processors to compute geodesic distances in parallel.

* * * * *